United States Patent
Mallick et al.

(10) Patent No.: US 11,231,861 B2
(45) Date of Patent: Jan. 25, 2022

(54) HOST DEVICE WITH ACTIVE-ACTIVE STORAGE AWARE PATH SELECTION

(71) Applicant: EMC IP Holding Company LLC, Hopkinton, MA (US)

(72) Inventors: Sanjib Mallick, Bangalore (IN); Vinay G. Rao, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/743,097

(22) Filed: Jan. 15, 2020

(65) Prior Publication Data

US 2021/0216228 A1 Jul. 15, 2021

(51) Int. Cl.
*G06F 3/06* (2006.01)
*H04L 29/08* (2006.01)
*H04L 12/707* (2013.01)

(52) U.S. Cl.
CPC ............ *G06F 3/0635* (2013.01); *G06F 3/067* (2013.01); *G06F 3/0611* (2013.01);
(Continued)

(58) Field of Classification Search
CPC .... G06F 3/0635; G06F 3/0611; G06F 3/0659; G06F 3/0665; G06F 3/067; G06F 3/0683;
(Continued)

(56) References Cited

U.S. PATENT DOCUMENTS 6,567,397 B1   5/2003  Campana et al.
6,687,746 B1   2/2004  Shuster et al.
(Continued)

FOREIGN PATENT DOCUMENTS

CN   103677927 B   2/2017
EP   1117028 A2    7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Eric Cardwell
(74) *Attorney, Agent, or Firm* — Ryan, Mason & Lewis, LLP

(57) ABSTRACT

An apparatus comprises at least one processing device that includes a processor coupled to a memory. The processing device is configured to control delivery of input-output (IO) operations from a host device to at least first and second storage systems over selected ones of a plurality of paths through a network, the first and second storage systems being arranged in an active-active configuration relative to one another. The processing device is further configured to identify one or more logical storage devices that are each accessible via at least first and second different ones of the paths to respective ones of the first and second storage systems, and to modify path selection for IO operations directed to the one or more identified logical storage devices relative to path selection for IO operations directed to one or more other logical storage devices. The processing device illustratively comprises at least a portion of the host device.

20 Claims, 3 Drawing Sheets

(52) U.S. Cl.
CPC .......... *G06F 3/0659* (2013.01); *G06F 3/0665* (2013.01); *G06F 3/0683* (2013.01); *H04L 29/08549* (2013.01); *H04L 45/24* (2013.01); *H04L 67/1097* (2013.01)

(58) Field of Classification Search
CPC ............... H04L 29/08549; H04L 45/24; H04L 67/1097
See application file for complete search history.

(56) References Cited

U.S. PATENT DOCUMENTS

| | | |
|---|---|---|
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,258,242 B1* | 2/2016 | Mallick ............... H04L 41/5019 |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1* | 12/2006 | Hayden ............... H04L 67/1097 711/170 |
| 2007/0174849 A1 | 7/2007 | Cheung et al. |
| 2008/0043973 A1 | 2/2008 | Lai et al. |
| 2008/0201458 A1 | 8/2008 | Salil |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2013/0339551 A1* | 12/2013 | Flanagan ............ G06F 13/4022 710/5 |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2018/0337992 A1* | 11/2018 | Kurian ................. H04L 67/327 |
| 2019/0095299 A1 | 3/2019 | Liu et al. |
| 2019/0108888 A1 | 4/2019 | Sarkar et al. |
| 2019/0310925 A1* | 10/2019 | Yoshida ............... G06F 3/0614 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
U.S. Appl. No. 15/795,653 filed in the name of Maneesh Pusalkar et al. Oct. 27, 2017 and entitled "Storage System with Network-Wide Configurable Device Names."
U.S. Appl. No. 16/142,274 filed in the name of Sanjib Mallick et al. Sep. 26, 2018 and entitled "Host Device with Multi-Path Layer Implementing Automatic Standby Setting for Active-Active Configuration."
U.S. Appl. No. 16/145,502 filed in the name of Vinay G. Rao et al. Sep. 28, 2018 and entitled "Host Device with Multi-Path Layer Implementing Path Selection Based At Least In Part on Fabric Identifiers."
U.S. Appl. No. 16/155,491 filed in the name of Kundan Kumar et al. Oct. 9, 2018 and entitled "Migrating Control of a Multi-Path Logical Device from a Current MPIO Driver to a Target MPIO Driver."
U.S. Appl. No. 16/155,429 filed in the name of Rimpesh Patel et al. Oct. 9, 2018 and entitled "Categorizing Host IO Load Pattern and Communicating Categorization to Storage System."
U.S. Appl. No. 16/697,393 filed in the name of Vinay G. Rao et al. Nov. 27, 2019 and entitled "Automated Seamless Migration of Logical Storage Devices."
U.S. Appl. No. 16/710,828 filed in the name of Amit Pundalik Anchi et al. Dec. 11, 2019 and entitled "Automated Seamless Migration with Signature Issue Resolution."
U.S. Appl. No. 16/694,291 filed in the name of Amit Pundalik Anchi et al. Nov. 25, 2019 and entitled "Host Device With Multi-Path Layer Implementing Efficient Load Balancing for Active-Active Configuration."

* cited by examiner

HOST DEVICE WITH ACTIVE-ACTIVE STORAGE AWARE PATH SELECTION

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery over paths from the host devices to storage ports of the storage system. The storage ports are typically limited in number and each has limited resources for handling TO operations received from the host devices. Different ones of the host devices can run different applications with varying workloads and associated TO patterns. Such host devices also generate additional TO operations in performing various data services such as replication and migration so as to meet business continuity requirements. Conventional host device multi-pathing arrangements are in some situations unable to deal adequately with these and other variabilities in TO processing behavior. For example, some existing multi-path layers implement a static path selection approach that does not produce optimal results in all situations, including situations in which logical storage volumes or other logical storage devices are replicated across multiple storage arrays arranged in an active-active configuration.

SUMMARY

Illustrative embodiments provide active-active storage aware path selection in a host device. The path selection is illustratively "active-active storage aware" in that it can determine whether or not a given logical storage volume or other logical storage device is replicated across multiple storage arrays in an active-active configuration, and adjust the selection process accordingly so as to improve performance. The paths illustratively comprise paths through a storage area network (SAN) or other type of network over which the host device communicates with multiple storage arrays or other types of storage systems arranged in an active-active configuration.

In some embodiments, the active-active storage aware path selection is implemented in a multi-path layer that comprises at least one multi-path input-output (MPIO) driver configured to process IO operations of at least one host device that communicates with multiple storage arrays or other types of storage systems.

The multi-path layer in such arrangements can be configured, for example, to detect particular logical storage volumes or other logical storage devices that are replicated across multiple storage arrays or other storage systems in an active-active configuration, such that the multi-path layer thereby becomes "aware" of the active-active configuration for those storage devices, and to modify the manner in which it performs path selection so as to provide enhanced load balancing between the multiple storage arrays under such conditions.

For example, the active-active storage aware path selection can be advantageously configured in some embodiments to ensure that path selection in the host device does not adversely impact data prefetching decisions, IO pattern recognition, automated storage tiering, machine learning or other similar IO-based functionality in the individual storage arrays. As a result, improved performance in processing of IO operations by the storage arrays is achieved.

In one embodiment, an apparatus comprises at least one processing device that includes a processor coupled to a memory. The processing device is configured to control delivery of IO operations from a host device to at least first and second storage systems over selected ones of a plurality of paths through a network, with the first and second storage systems illustratively being arranged in an active-active configuration relative to one another. The processing device is further configured to identify one or more logical storage devices that are each accessible via at least first and second different ones of the paths to respective ones of the first and second storage systems, and to modify path selection for IO operations directed to the one or more identified logical storage devices relative to path selection for IO operations directed to one or more other logical storage devices.

The processing device illustratively comprises at least a portion of the host device, and in some embodiments includes an MPIO driver that performs at least a portion of the identification and modification.

The paths are illustratively associated with respective initiator-target pairs, with the initiators being implemented on the host device and the targets being implemented on the first and second storage systems. The initiators of the initiator-target pairs illustratively comprise respective host bus adaptors (HBAs) of the host device and the targets of the initiator-target pairs illustratively comprise respective storage array ports of the first and second storage systems. Other types of initiators and targets can be used in other embodiments.

In some embodiments, identifying one or more logical storage devices that are each accessible via at least first and second different ones of the paths to respective ones of the first and second storage systems comprises sending commands on respective ones of the paths over which a given logical storage device is accessible to the host device, obtaining from at least one of the first and second storage systems information regarding the given logical storage device responsive to the commands, and determining whether or not the given logical storage device is accessible via at least first and second different ones of the paths to respective ones of the first and second storage systems based at least in part on the obtained information.

The commands in such an embodiment illustratively comprise respective commands of a storage protocol that the host device utilizes to communicate with the first and second storage systems. For example, the commands may comprise respective inquiry page commands each of which when received by one of the first and second storage systems causes a designated page comprising logical storage device constituency information to be returned by that storage system to the host device.

The obtained information for one of the commands sent on one of the paths in some embodiments comprises an identifier of the given logical storage device and an identifier of its corresponding one of the first and second storage systems.

In arrangements of this type, the given logical storage device may be identified as one of the one or more logical storage devices that are each accessible via at least first and second different ones of the paths to respective ones of the first and second storage systems responsive to the obtained information for one of the commands comprising an identifier of the first storage system and the obtained information for another one of the commands comprising an identifier of the second storage system.

In some embodiments, modifying path selection for IO operations directed to the one or more identified logical storage devices relative to path selection for IO operations directed to one or more other logical storage devices comprises separating a given one of the one or more identified logical storage devices into at least first and second portions, sending IO operations directed to the first portion over one or more selected paths to the first storage system, and sending IO operations directed to the second portion over one or more selected paths to the second storage system.

Path selection for the one or more other logical storage devices is not configured in this manner but instead, for example, treats each such other logical storage device as a unitary device rather than as a separated device in selecting paths for delivery of IO operations directed to that other logical storage device.

The above-noted separating of a given identified logical storage device into at least first and second portions illustratively comprises separating the given identified logical storage device into n contiguous portions each representing a corresponding fraction 1/n of a contiguous logical address space of the identified logical storage device, where n is an even integer greater than or equal to two. A wide variety of other logical storage device separation arrangements can be used in other embodiments, and terms such as "separating" and "separated" as used herein are therefore intended to be broadly construed.

Additionally or alternatively, modifying path selection for IO operations directed to the one or more identified logical storage devices relative to path selection for IO operations directed to one or more other logical storage devices comprises determining a particular portion of a given one of the one or more identified logical storage devices that is experiencing a relatively high level of IO activity relative to one or more other portions of the given identified logical storage device, separating the particular portion into at least first and second sub-portions, sending IO operations directed to the first sub-portion over one or more selected paths to the first storage system, and sending IO operations directed to the second sub-portion over one or more selected paths to the second storage system. As indicated previously in the context of other embodiments, path selection for the one or more other logical storage devices is not configured in this manner but instead, for example, treats each such other logical storage device as a unitary device rather than as a separated device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
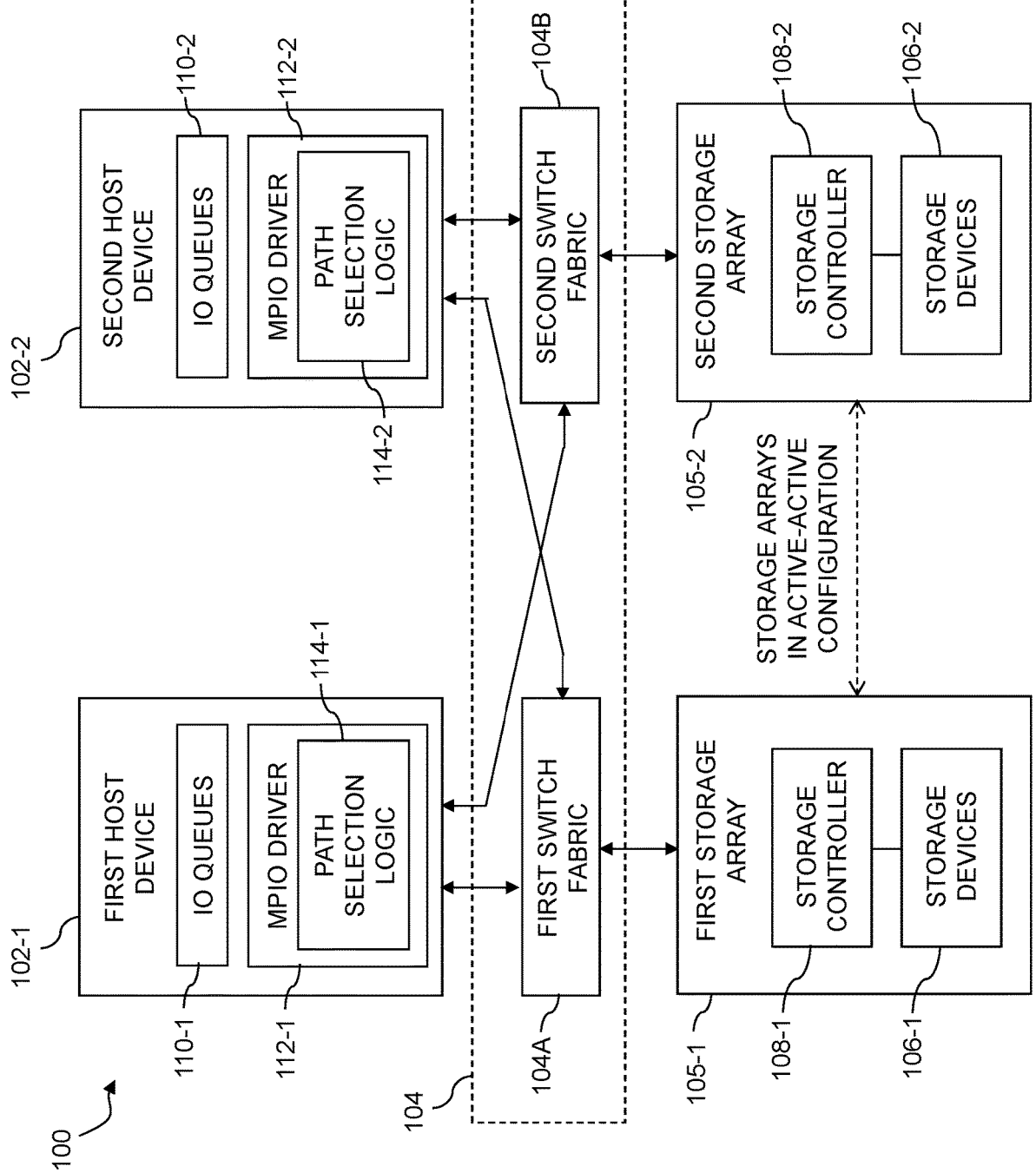
FIG. 1 is a block diagram of an information processing system configured to implement active-active storage aware path selection utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the fabrics 104A and 104B illustratively comprise respective distinct switch fabrics of a set of multiple switch fabrics interconnecting the host devices 102 with the storage arrays 105 over the one or more SANs. Each of the fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are illustratively arranged in an active-active configuration, although other storage configurations can be used in other embodiments. In an example of an active-active configuration that may be used, data stored in one of the storage arrays 105 is replicated to the other one of the storage arrays 105 utilizing a synchronous replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 are therefore assumed to be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic illustratively controls performance of the above-noted synchronous replication process, or other replication processes in other embodiments. The snapshot generator is used to generate snapshots of one or more storage volumes that are subject to synchronous replication in conjunction with active-active storage clustering. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for path selection modification. Other types of MPIO drivers from other driver vendors may be suitably modified to incorporate functionality for path selection modification as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

Other host device components can additionally or alternatively perform at least portions of controlling delivery of IO operations over selected paths, such as one or more host device processors or other control logic instances. Illustrative embodiments are therefore not limited to arrangements in which MPIO drivers perform such delivery control functions for IO operations. Moreover, terms such as "controlling delivery" of an IO operation as used herein are intended to be broadly construed so as to encompass, for example, selecting from a plurality of paths a particular path over which a particular IO operation is to be sent to one of the storage arrays 105, and sending the IO operation over that path.

In the FIG. 1 embodiment, the network 104 comprises first and second switch fabrics 104A and 104B through which the first and second host devices 102-1 and 102-2 are cross-connected to the first and second storage arrays 105-1 and 105-2 as shown. In a cross-connected arrangement of this type, supporting active-active configuration of the storage arrays 105 for the multiple host devices 102, use of conventional path selection in the MPIO drivers 112 of host devices 102 can lead to problems, as indicated previously. For example, if the MPIO driver 112-1 were to implement the same path selection for all logical storage devices using a round robin path selection algorithm, it would send at least different IO operations for each logical storage device to different ones of storage arrays 105. This can potentially undermine the performance of various types of IO-based functionality of the individual storage arrays 105, by in effect partially obscuring the actual IO pattern for a given logical storage device from each of the individual storage arrays 105.

Such issues can arise in arrangements in which replication of a given logical storage device across storage arrays 105 involves "spoofing" of logical storage device identifiers. For example, in accordance with such spoofing, a replicated logical storage device will have the same device identifier on both storage arrays 105. Accordingly, in embodiments of this type in which storage array information is embedded in the device identifier, and the device on the second storage array 105-2 is spoofing the device on the first storage array 105-1 by using its device identifier, the storage array information embedded in the spoofed device identifier will indicate the first storage array 105-1 and not the second storage array 105-2, even though the spoofing device is on the second storage array 105-2.

These and other issues are addressed in illustrative embodiments herein by configuring the MPIO drivers 112 of the host devices 102 to incorporate active-active storage aware path selection functionality, as will now be described in further detail.

The MPIO driver 112-1 in implementing at least portions of the active-active storage aware path selection functionality of host device 102-1 is further configured in illustrative embodiments to identify one or more logical storage volumes or other logical storage devices that are each accessible via at least first and second different ones of the paths to respective ones of the first and second storage arrays 105, and to modify path selection for IO operations directed to the one or more identified logical storage devices relative to path selection for IO operations directed to one or more other logical storage devices.

For example, modifying path selection in the host device 102-1 for the one or more identified logical storage devices each accessible via different paths to both of the storage arrays 105 illustratively comprises modifying the path selection performed by path selection logic 114-1 for a particular one of the one or more identified logical storage devices, for at least a portion of a time period during which that logical storage device remains identified as being replicated across the storage arrays 105.

The MPIO driver 112-1 in identifying one or more logical storage devices that are each accessible via at least first and second different ones of the paths to respective ones of the first and second storage arrays 105 is illustratively configured to send commands on respective ones of the paths over which a given logical storage device is accessible to the host device 102-1. The MPIO driver 112-1 obtains, from at least one of the first and second storage arrays 105, information regarding the given logical storage device responsive to the commands, and determines whether or not the given logical storage device is accessible via at least first and second different ones of the paths to respective ones of the first and second storage arrays 105 based at least in part on the obtained information.

For example, the commands sent by the MPIO driver 112-1 over paths to the first and second storage arrays for a given one of the logical storage devices illustratively comprise commands of a particular storage protocol, such as a SCSI protocol or an NVMe protocol, that the host device 102-1 utilizes to communicate with the first and second storage arrays 105.

Such commands may comprise respective inquiry page commands each of which when received by one of the first and second storage arrays 105 causes a designated page comprising logical storage device constituency information to be returned by that storage array to the host device 102-1.

In some embodiments, the obtained information for one of the commands sent by the MPIO driver 112-1 on one of the paths comprises an identifier of the given logical storage device and an identifier of its corresponding one of the first and second storage arrays 105.

Such information is illustratively obtained using a particular type of inquiry page command, namely, a SCSI Inquiry ("Inq") page 0x8B command. This command returns a device constituency page that includes both the device identifier and the storage array serial number or other storage array identifier. Accordingly, the MPIO driver 112-1 by sending this command on each of the paths associated with a given logical storage device can determine whether or not the device is accessible on multiple distinct storage arrays. Moreover, use of such a command overcomes issues associated with device spoofing, as the storage array identifier is obtained responsive to the command, in addition to the device identifier. In this manner, even if device spoofing is used, the MPIO driver 112-1 can still determine whether or not a given logical storage device is accessible on both of the storage arrays 105.

It should be noted that certain other types of inquiry page commands, such as a SCSI Inq page 0x83 which returns a potentially spoofed device identifier without a separate storage array identifier, cannot be used to definitively determine whether or not a given logical storage device has been replicated across the multiple storage arrays 105.

Illustrative embodiments therefore utilize inquiry page commands that reveal the actual storage array identifier in addition to the device identifier. Again, other types of commands can be used in other embodiments.

The MPIO driver 112-1 can therefore identify the given logical storage device as one of the one or more logical storage devices that are each accessible via at least first and second different ones of the paths to respective ones of the first and second storage arrays 105 responsive to the obtained information for one of the commands comprising an identifier of the first storage array 105-1 and the obtained information for another one of the commands comprising an identifier of the second storage array 105-2.

For example, if the MPIO driver 112-1 obtains information for two different commands, sent over different paths for the given logical storage device, that identifies different ones of the storage arrays 105, the MPIO driver 112-1 knows that the given logical storage device is replicated over the storage arrays 105, illustratively in accordance with the active-active configuration. The MPIO driver 112-1 responds to this detected condition by modifying the manner in which it performs path selection for the given logical storage device. Similar operations are used to identify other logical storage devices that are replicated across the first and second storage arrays 105 in accordance with the active-active configuration.

It is to be appreciated that a wide variety of different types of commands or other types of communications between the host device 102-1 and the storage arrays 105 can be used to allow the host device 102-1 and its associated MPIO driver 112-1 to identify one or more logical storage devices that are replicated across the storage arrays 105, even in the presence of spoofing of device identifiers.

In modifying path selection for IO operations directed to the one or more identified logical storage devices, relative to path selection for IO operations directed to one or more other logical storage devices, the MPIO driver 112-1 illustratively separates a given one of the one or more identified logical storage devices into at least first and second portions, sends IO operations directed to the first portion over one or more selected paths to the first storage array 105-1, and sends IO operations directed to the second portion over one or more selected paths to the second storage array 105-2.

The use of paths to the first storage array 105-1 for the first portion of the given logical storage device and paths to the second storage array 105-2 for the second portion of the given logical storage device can be varied, for example, with the relations between the portions and the storage arrays 105 being reversed in other embodiments.

Path selection for the one or more other logical storage devices is not configured in this manner but instead, for example, treats each such other logical storage device as a unitary device rather than as a separated device in selecting paths for delivery of IO operations directed to that other logical storage device. For example, unmodified versions of load balancing algorithms or other path selection algorithms, such as round robin, least recently used (LRU), or other types of conventional path selection algorithms well known to those skilled in the art, may be used in selecting paths for IO operations directed to the logical storage devices that are not identified as being replicated across both storage arrays 105. Illustrative embodiments therefore implement different types of path selection for logical storage devices that are identified as being replicated across the storage arrays 105 than for the other logical storage devices that are not identified as being replicated across the storage arrays 105.

In separating a given identified logical storage device into at least first and second portions, the MPIO driver 112-1 illustratively separates the given identified logical storage device into n contiguous portions each representing a corresponding fraction 1/n of a contiguous logical address space of the identified logical storage device, where n is an even integer greater than or equal to two. For example, the MPIO driver 112-1 can separate the given identified logical storage device into two halves, such that n=2 and IO operations directed to the first half are sent over paths to storage array 105-1 and IO operations directed to the second half are sent over paths to storage array 105-2. As another example, the MPIO driver 112-1 can separate the given identified logical storage device into four quarters, such that n=4 and IO operations directed to the first and third quarters are sent over paths to storage array 105-1 and IO operations directed to the second and fourth quarters are sent over paths to storage array 105-2. Numerous other separation arrangements are possible.

It is to be appreciated that terms such as "separating" and "separated" as used herein are intended to be broadly construed, and should not be viewed as requiring any type of physical separation of any logical storage device or its associated system components into different portions. To the contrary, such separation of a given logical storage device is for purposes of path selection, with IO operations directed to different ones of the portions being sent by the MPIO driver 112-1 over selected paths to different ones of the storage arrays 105, so as to avoid adversely impacting data prefetching decisions, IO pattern recognition, automated storage tiering, machine learning and other similar IO-based functionality in the individual storage arrays 105, which might otherwise lead to degraded IO processing performance.

A wide variety of other logical storage device separation arrangements can be used in other embodiments. A logical storage device that is not separated in this manner is treated as what is referred to herein as a "unitary" or non-separated device for purposes of path selection. The MPIO driver 112-1 illustratively provides different types of path selection for separated devices than it does for non-separated devices.

In some embodiments, the MPIO driver 112-1 in modifying path selection for IO operations directed to the one or more identified logical storage devices relative to path selection for IO operations directed to one or more other logical storage devices more particularly determines a particular portion of a given one of the one or more identified logical storage devices that is experiencing a relatively high level of IO activity relative to one or more other portions of the given identified logical storage device. The particular portion is illustratively one of the above-noted portions into which the given identified logical storage device is separated, such as the first half of such a device. The MPIO driver 112-1 then separates the particular portion into at least first and second sub-portions, sends IO operations directed to the first sub-portion over one or more selected paths to the first storage array 105-1, and sends IO operations directed to the second sub-portion over one or more selected paths to the second storage array 105-2. As indicated previously, path selection for the one or more other logical storage devices is not configured in this manner but instead, for example, treats each such other logical storage device as a unitary device rather than as a separated device.

Although in the present embodiment and other embodiments herein MPIO drivers are used to perform path selection modification in conjunction with active-active storage aware path selection, this is by way of illustrative example only, and other host device components can alternatively implement at least portions of such path selection modification functionality. Accordingly, path selection modification functionality in some embodiments can be distributed across multiple host device components, possibly including MPIO drivers in combination with other host device components such as host device processors and associated control logic instances.

As described above, the MPIO driver 112-1 in the FIG. 1 embodiment is configured to identify one or more logical storage volumes or other logical storage devices that are each accessible via paths to both of the storage arrays 105. The MPIO driver 112-1 illustratively maintains one or more data structures that specify each path or set of paths associated with a given logical storage device to which IO operations may be directed by the MPIO driver 112-1, including information characterizing the particular HBA and storage array port that are the respective initiator and target for each such path.

The above-noted data structures may more particularly comprise storage array objects that include "inventories" of storage devices of their corresponding storage arrays, with such objects being maintained by the MPIO driver 112-1. For example, a first data structure illustratively comprises a first object specifying a first set of paths between the host device 102-1 and at least one of the first and second storage arrays 105, and a second data structure comprises a second object specifying a second set of paths between the host device 102-1 and at least one of the first and second storage arrays 105. In some embodiments, at least one of the first object and the second object comprises a federated object that specifies paths to both the first and the second storage arrays for a paired logical device that is identified by the MPIO driver 112-1 as a single logical device but has separate corresponding logical devices on the respective first and second storage arrays 105.

Other types and arrangements of data structures maintained by the MPIO driver 112-1 can be used in identifying one or more logical storage devices that are each accessible via paths to both of the storage arrays 105.

In some embodiments, the MPIO driver 112-1 in modifying path selection in the host device 102-1 for the one or more identified logical storage devices is more particularly configured, for example, to modify the operation of a load balancing algorithm or other path selection algorithm implemented by the path selection logic 114-1.

For example, the MPIO driver 112-1 can illustratively modify the operation of a load balancing algorithm that it uses in path selection in the path selection logic 114-1 based at least in part on the one or more identified logical storage devices that are each accessible via paths to both of the storage arrays 105.

The MPIO driver 112-1 can also detect for at least one of the one or more identified logical storage devices a change in its configuration. For example, a given one of the one or more identified logical storage devices that are each accessible via paths to both of the storage arrays 105 can have its configuration altered so that it is no longer accessible via paths to both of the storage arrays 105. Responsive to detection of such a change, the MPIO driver 112-1 can restore the modified path selection in the host device 102-1 for that logical storage device to its state prior to the modification. Accordingly, by way of illustrative example, after all of the logical storage devices previously identified as being accessible via paths to both of the storage arrays 105 are no longer accessible via paths to both of the storage arrays 105, any corresponding modifications in path selection implemented by the MPIO driver 112-1 can be reversed, to thereby restore normal path selection functionality.

The above-described functions associated with path selection modification in the MPIO driver 112-1 are illustratively carried out at least in part under the control of its path selection logic 114-1. For example, the path selection logic 114-1 is illustratively configured to control performance of the steps of the flow diagram to be described below in conjunction with FIG. 2. In other embodiments, the FIG. 2 process can be performed at least in part by other host device components, such as by one or more host device processors and/or associated control logic instances.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed path selection modification functionality. Accordingly, path selection modification functionality described above in the context of the first MPIO driver 112-1 is assumed to be similarly performed by the other MPIO driver 112-2.

The MPIO drivers 112 in some embodiments can include well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support path selection modification.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising one or more host devices and at least first and second storage systems. The storage systems in this embodiment are assumed to more particularly comprise respective first and second storage arrays each comprising a plurality of storage devices. The storage devices of the first and second storage arrays are assumed to include logical storage devices such as LUNs or other logical storage volumes.

Figure 2:
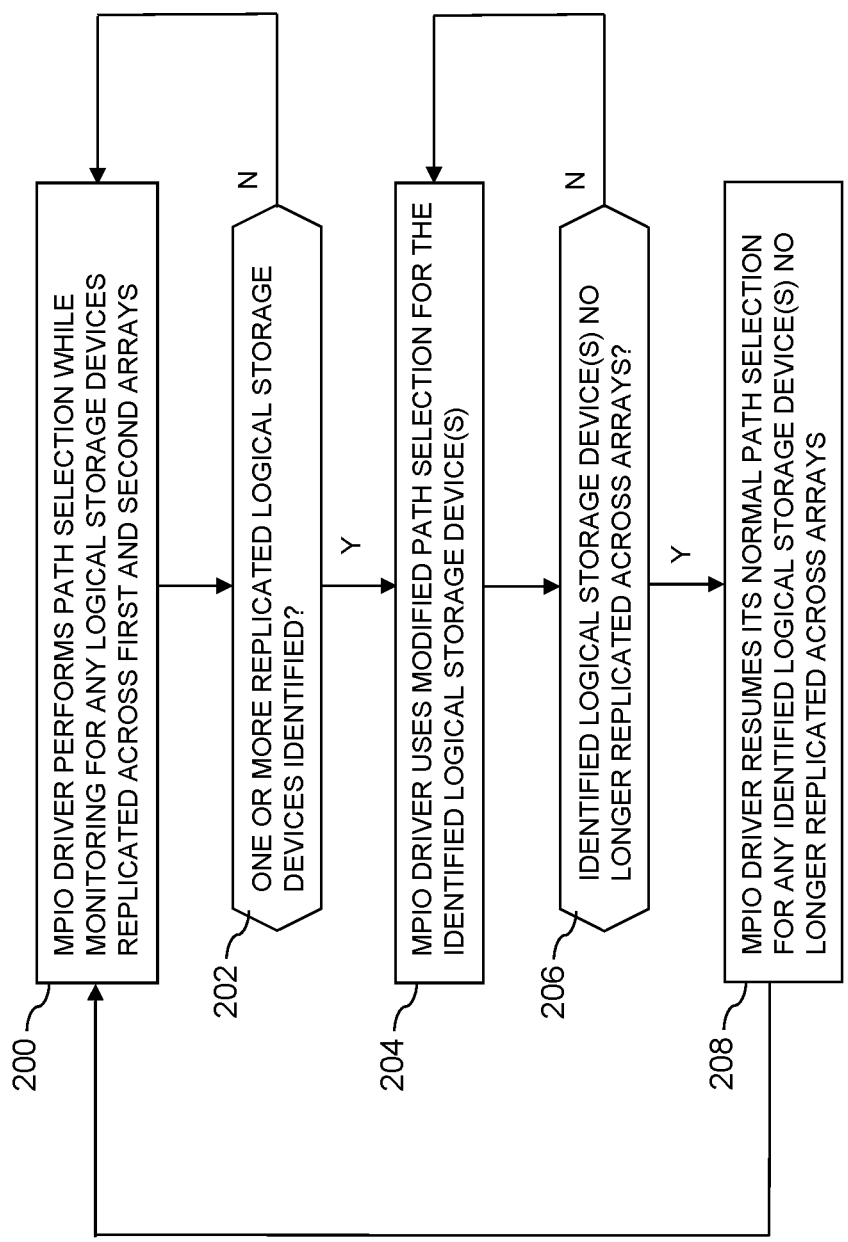
FIG. 2 is a flow diagram of a process that implements active-active storage aware path selection utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process is illustratively performed in conjunction with a load balancing algorithm or other path selection algorithm executed by the path selection logic 114-1.

In step 200, the MPIO driver performs path selection while monitoring for one or more logical storage devices that are replicated across first and second storage arrays arranged in an active-active configuration.

In step 202, a determination is made by the MPIO driver as to whether or not one or more such replicated logical storage devices have been identified. If at least one such logical storage device has been identified, the process moves to step 204, and otherwise returns to step 200 to continue performing path selection while monitoring for any logical storage devices that are replicated across the first and second storage arrays.

In step 204, which is reached responsive to detection of at least one logical storage device that is replicated across the first and second storage arrays, the MPIO driver uses modified path selection for the one or more identified logical storage devices. Although not explicitly indicated in step 204, the MPIO driver also monitors for changes in configuration of the one or more identified logical storage devices.

In step 206, a determination is made by the MPIO driver as to whether or not any of the one or more identified logical storage devices are no longer replicated across the first and second storage arrays, but are instead, for example, now accessible on only one of the storage arrays. This may be due, for example, to updated zoning and masking or other types of storage system reconfigurations subsequent to the identification of the one or more logical storage devices in conjunction with steps 200 and 202. If the one or more identified logical storage devices are no longer replicated across the first and second storage arrays, the process moves to step 208, and otherwise returns to step 204 to continue using the modified path selection for the one or more identified logical storage devices, while also monitoring for changes in configuration of the one or more identified logical storage devices.

In step 208, which is reached responsive to at least one of the one or more identified logical storage devices no longer being replicated across the first and second storage arrays, the MPIO driver resumes its normal path selection for any such previously identified logical storage device that is no longer replicated across the first and second storage arrays. The process then returns to step 200 as indicated.

Different instances of steps 204, 206 and 208 can be separately performed for each of the logical storage devices identified as being replicated across the first and second storage arrays in conjunction with steps 200 and 202.

The various steps of the FIG. 2 process are illustratively shown as being performed serially, but certain steps can at least partially overlap with other steps.

Also, multiple additional instances of the FIG. 2 process can be performed in respective ones of one or more additional host devices that share the first and second storage arrays. As another example, different instances of the FIG. 2 process can be performed for each of a plurality of different logical storage devices, with each such instance separately detecting replication of a corresponding logical storage device across the first and second storage arrays, and controlling path selection with respect to that identified logical storage device.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and path selection modification functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different path selection modification arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
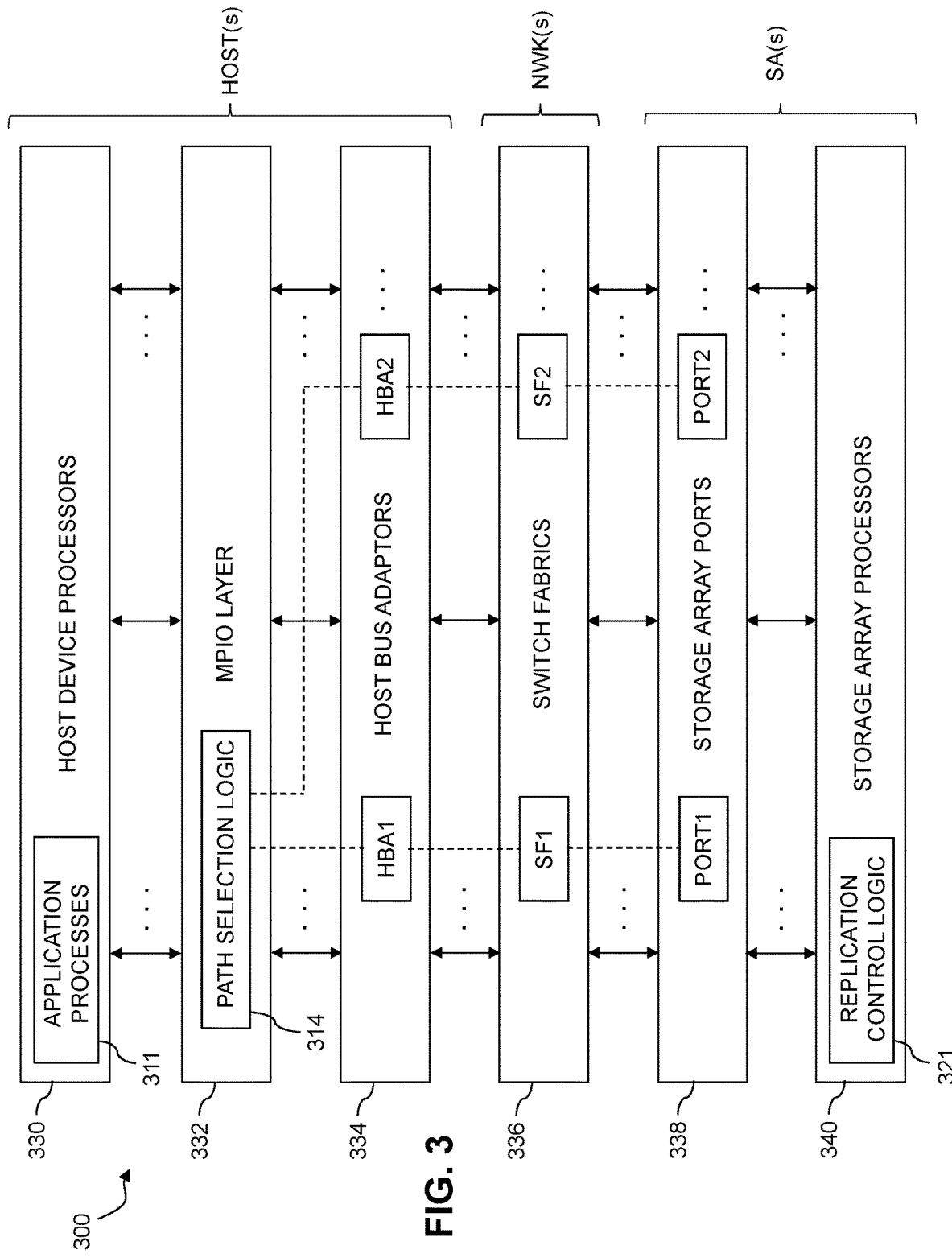
FIG. 3 is a block diagram showing multiple layers of a layered system architecture that includes a multi-path layer with active-active storage aware path selection in an illustrative embodiment.

Referring now to FIG. 3, another illustrative embodiment is shown. In this embodiment, an information processing system 300 comprises application processes 311, path selection logic 314 and replication control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements path selection modification in conjunction with identification of one or more logical storage devices that are replicated across first and second storage arrays, illustratively arranged in an active-active configuration relative to one another, in a manner similar to that described elsewhere herein. The application processes 311 are illustratively running in one or more host device processors of the host device processor layer 330. The path selection modification functionality in this embodiment is assumed to be controlled at least in part by path selection logic 314 of the MPIO layer 332, although other arrangements are possible.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for path selection modification in conjunction with identification of one or more logical storage devices that are replicated across first and second storage arrays as previously described. Additional or alternative layers and path selection logic arrangements can be used in other embodiments.

The replication control logic 321 implemented in the storage array processor layer 340 controls the active-active configuration of a given pair of storage arrays, or other types of replication arrangements implemented in the system 300. For example, the replication control logic 321 can include functionality for carrying out a synchronous replication process between first and second storage arrays in the active-active configuration. It is also possible in some embodiments that the replication control logic 321 can include multiple distinct replication control logic instances for respective ones of a plurality of storage arrays of the system 300. Although not explicitly shown in the figure, additional replication control logic is illustratively implemented in the host device processor layer 330, or elsewhere in the system 300, such as in the MPIO layer 332.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a particular number and type of paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths in conjunction with identification of one or more logical storage devices that are replicated across first and second storage arrays, the path selection logic 314 implements a different path selection for IO operations directed to the one or more identified logical storage devices than it does for IO operations directed to one or more other logical storage devices, as described elsewhere herein. For example, the path selection logic 314 can modify a load balancing algorithm or other path selection algorithm normally used to select the paths for delivery of IO operations such that the paths are selected in a different manner for the one or more identified logical storage devices than for one or more other logical storage devices that are not so identified.

Accordingly, in this embodiment the host devices of system 300 through their respective MPIO drivers and respective instances of path selection logic 314 provide functionality for path selection modification in conjunction with identification of one or more logical storage devices that are replicated across multiple storage arrays, possibly with involvement of other host device or system components.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Again, different instances of the above-described path selection modification process can be performed by different MPIO drivers in different host devices.

Another example of a path selection modification process implemented utilizing a multi-path layer such as MPIO layer 332 of the FIG. 3 embodiment will now be described in more detail. Such a process utilizes path selection logic of one or more host devices to provide modified path selection responsive to identification of one or more logical storage devices that are replicated across first and second storage arrays that are arranged in an active-active configuration relative to one another.

As indicated previously, performance issues can arise when the same type of path selection is applied both to logical storage devices that are replicated across multiple storage arrays and to logical storage devices that are not replicated across the multiple storage arrays but are instead accessible on only one of the storage arrays.

For example, path selection logic in conventional host device implementations can adversely impact data prefetching decisions, IO pattern recognition, automated storage tiering, machine learning and other similar IO-based functionality in the individual storage arrays, potentially leading to degraded IO processing performance.

Illustrative embodiments disclosed herein advantageously overcome these and other drawbacks of conventional arrangements, for example, though path selection modification in a multi-path layer of the host device, as will now be further described in the context of the present example. The present example more particularly comprises an algorithm that is illustratively performed by an MPIO driver of a multi-path layer of a host device and includes the following steps:

1. The MPIO driver issues an Inq page 0x8B command on each path for which a given logical storage device is visible to the host device. As indicated previously, such a command returns a device constituency page that includes an identifier of the given logical storage device as well as a corresponding storage array identifier, illustratively a storage array serial number. Accordingly, if different ones of the commands sent over respective different ones of the paths for the given logical storage device return different storage array identifiers, the MPIO driver identifies that logical storage device as being accessible via the different paths to the multiple storage arrays.

2. The MPIO driver denotes the storage array having the lowest returned serial number for the identified logical storage device as "array-1" and the other storage array for which a serial number was returned for the identified logical storage device as "array-2." This assignment can be reversed in other embodiments.

3. The MPIO driver separates the identified logical storage device into first and second halves, illustratively an upper portion and a lower portion of the logical address space of the device. As indicated previously, other types of separation of an identified logical storage device into multiple portions can be used.

4. The MPIO driver alters its path selection for the identified logical storage device such that all IO operations directed to logical addresses in the first half of the device are sent to array-1, and all IO operations directed to logical addresses the second half of the device are sent to array-2.

Similar operations are performed for each of one or more additional logical storage devices of the system.

The above example algorithm avoids adverse impacts to data prefetching decisions, IO pattern recognition, automated storage tiering, machine learning and other similar IO-based functionality in the individual storage arrays, while also ensuring that none of the storage arrays are inadvertently overloaded with all of the IO operations for a given logical storage device, for example, in the case of device spoofing performed in conjunction with the active-active configuration of the storage arrays.

Other types of separation of an identified logical storage device can be used, instead of the separation into upper and lower halves as described above. For example, the device can be separated into four portions, each corresponding to a different contiguous range of logical addresses of the logical storage device, with the IO operations directed to logical addresses within a given one of the portions always being sent to the same storage array. Thus, IO operations directed to logical addresses in the first quarter are sent to array-1, IO operations directed to logical addresses in the second quarter are sent to array-2, IO operations directed to logical addresses in the third quarter are sent to array-1, and so on.

The above example algorithm can be further enhanced to take into account IO locality. For example, if the first half of the device has a higher IO activity than the second half of the device, which is likely in the case of a growing database, then the MPIO can further enhance the division resolution as follows:

1. The MPIO driver tracks the logical address range currently being used, and divides this portion of the logical storage device into sub-portions. For example, the MPIO driver may identify that a portion corresponding to the first quarter of the device is currently subject to elevated IO activity relative to other portions of the device, and separate the identified portion into two sub-portions, each corresponding to ⅛ of the device.

2. The MPIO will send IO operations directed to logical addresses in the first sub-portion (e.g., the first ⅛ of the device) to array-1 and will send IO operations directed to logical addresses in the second sub-portion (e.g., the second ⅛ of the device) to array-2.

Again, numerous other separations of a given logical storage device into portions and sub-portions are possible, with associated adjustments in path selection for the different portions or sub-portions to ensure that IO operations directed to those portions or sub-portions are sent over paths to the appropriate storage arrays.

These particular steps are illustrative only, and additional or alternative steps can be used in other embodiments. Also, although shown as being performed serially, one or more of the steps may each at least partially overlap with other ones of the steps.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as PowerPath® drivers commercially available from Dell EMC. Other embodiments can be implemented in other MPIO drivers from other multi-pathing software vendors.

Moreover, other host device components, such as logic instances and/or host processors, can additionally or alternatively be used.

The process in the present example advantageously provides proactive adjustments in a path selection algorithm responsive to identification of one or more logical storage devices that are replicated across first and second storage arrays, in a manner that improves overall IO processing performance.

The process is illustratively performed by one or more MPIO drivers and associated path selection logic instances of a multi-path layer of a given host device. A similar process is assumed to be performed on any respective other host devices.

Other types of path selection modification involving alteration of load balancing logic or other path selection logic can be implemented in one or more host devices in other embodiments in conjunction with identification of one or more logical storage devices that are replicated across first and second storage arrays in an active-active configuration.

Some embodiments include only a single host device, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular path selection modification arrangements described above are presented by way of illustrative example only. Numerous alternative arrangements of these and other features can be used in implementing path selection modification in other embodiments.

The illustrative embodiments disclosed herein can provide a number of significant advantages relative to conventional arrangements.

For example, some embodiments configure a host device to include path selection modification functionality for one or more logical storage devices that are identified as being replicated across multiple storage systems, such as first and second storage systems arranged in an active-active configuration.

Illustrative embodiments can provide active-active storage aware path selection in a host device. The path selection is illustratively "active-active storage aware" in that it can determine whether or not a given logical storage volume or other logical storage device is replicated across multiple storage arrays in an active-active configuration, and adjust the selection process accordingly so as to improve performance.

In some embodiments, the active-active storage aware path selection is implemented in a multi-path layer that comprises at least one MPIO driver configured to process IO operations of at least one host device that communicates with multiple storage arrays or other types of storage systems.

The multi-path layer in such arrangements can be configured, for example, to detect particular logical storage volumes or other logical storage devices that are replicated across multiple storage arrays or other storage systems in an active-active configuration, such that the multi-path layer thereby becomes "aware" of the active-active configuration for those storage devices, and to modify the manner in which it performs path selection so as to provide enhanced load balancing between the multiple storage arrays under such conditions.

For example, the active-active storage aware path selection can be advantageously configured in some embodiments to ensure that path selection in the host device does not adversely impact data prefetching decisions, IO pattern recognition, automated storage tiering, machine learning or other similar IO-based functionality in the individual storage arrays. As a result, improved performance in processing of IO operations by the storage arrays is achieved.

The disclosed functionality can be implemented using a wide variety of types of host devices each configured to interact with multiple distinct storage arrays or other types of storage systems.

These and other arrangements are advantageously configured to provide path selection modification for efficient load balancing even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated path selection modification arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to control delivery of input-output operations from a host device to at least first and second storage systems over selected ones of a plurality of paths through a network, the first and second storage systems being arranged in an active-active configuration relative to one another;
to identify one or more logical storage devices that are each accessible via at least first and second different ones of the paths to respective ones of the first and second storage systems; and
to modify path selection for input-output operations directed to the one or more identified logical storage devices relative to path selection for input-output operations directed to one or more other logical storage devices;
wherein a given one of the identified logical storage devices is stored in the first storage system as a first instance of the given identified logical storage device and is also stored in the second storage system as a second instance of the given identified logical storage device, so as to be fully accessible in each of the first and second storage systems; and
wherein input-output operations targeting logical addresses in a first range of logical addresses of the given identified logical storage device are directed to the first instance of the given logical storage device in the first storage system, and input-output operations targeting logical addresses in a second range of logical addresses of the given identified logical storage device, different than the first range of logical addresses of the given identified logical storage device, are directed to the second instance of the given logical storage device in the second storage system, in accordance with the modified path selection for the input-output operations directed to the given identified logical storage device.

2. The apparatus of claim 1 wherein modifying path selection for input-output operations directed to the one or more identified logical storage devices relative to path selection for input-output operations directed to one or more other logical storage devices comprises:
performing path selection for the given identified logical storage device in a manner that separates the given identified logical storage device into multiple portions and applies different path selection techniques to different ones of the portions; and
performing path selection for a given one of the one or more other logical storage devices in a manner that treats the given other logical storage device as a unitary device and applies a single path selection technique to that unitary device.

3. The apparatus of claim 1 wherein the paths are associated with respective initiator-target pairs, the initiators being implemented on the host device and the targets being implemented on the first and second storage systems, and wherein the initiators of the initiator-target pairs comprise respective host bus adaptors of the host device and the targets of the initiator-target pairs comprise respective storage array ports of the first and second storage systems.

4. The apparatus of claim 1 wherein said at least one processing device comprises at least a portion of the host device.

5. The apparatus of claim 4 wherein said at least one processing device comprises a multi-path input-output driver of the host device, with the multi-path input-output driver of the host device being configured to control the delivery of the input-output operations from the host device to the first and second storage systems over the selected ones of the plurality of paths through the network.

6. The apparatus of claim 5 wherein the multi-path input-output driver is further configured to perform at least a portion of the identifying one or more logical storage devices, and the modifying of path selection for input-output operations directed to the one or more identified logical storage devices.

7. The apparatus of claim 1 wherein identifying one or more logical storage devices that are each accessible via at least first and second different ones of the paths to respective ones of the first and second storage systems comprises:
  sending commands on respective ones of the paths over which a given logical storage device is accessible to the host device;
  obtaining from at least one of the first and second storage systems information regarding the given logical storage device responsive to the commands; and
  determining whether or not the given logical storage device is accessible via at least first and second different ones of the paths to respective ones of the first and second storage systems based at least in part on the obtained information.

8. The apparatus of claim 7 wherein the commands comprise respective commands of a storage protocol that the host device utilizes to communicate with the first and second storage systems.

9. The apparatus of claim 7 wherein the commands comprise respective inquiry page commands each of which when received by one of the first and second storage systems causes a designated page comprising logical storage device constituency information to be returned by that storage system to the host device.

10. The apparatus of claim 7 wherein the obtained information for one of the commands sent on one of the paths comprises an identifier of the given logical storage device and an identifier of its corresponding one of the first and second storage systems.

11. The apparatus of claim 10 wherein the given logical storage device is identified as one of the one or more logical storage devices that are each accessible via at least first and second different ones of the paths to respective ones of the first and second storage systems responsive to the obtained information for one of the commands comprising an identifier of the first storage system and the obtained information for another one of the commands comprising an identifier of the second storage system.

12. The apparatus of claim 1 wherein modifying path selection for input-output operations directed to the one or more identified logical storage devices relative to path selection for input-output operations directed to one or more other logical storage devices comprises:
  separating the given identified logical storage device into at least first and second portions;
  sending input-output operations directed to the first portion over one or more selected paths to the first storage system; and
  sending input-output operations directed to the second portion over one or more selected paths to the second storage system.

13. The apparatus of claim 12 wherein separating the given identified logical storage device into at least first and second portions comprises separating the given identified logical storage device into n contiguous portions each representing a corresponding fraction 1/n of a contiguous logical address space of the identified logical storage device, where n is an even integer greater than or equal to two.

14. The apparatus of claim 1 wherein modifying path selection for input-output operations directed to the one or more identified logical storage devices relative to path selection for input-output operations directed to one or more other logical storage devices comprises:
  determining a particular portion of the given identified logical storage device that is experiencing a relatively high level of input-output activity relative to one or more other portions of the given identified logical storage device;
  separating the particular portion into at least first and second sub-portions;
  sending input-output operations directed to the first sub-portion over one or more selected paths to the first storage system; and
  sending input-output operations directed to the second sub-portion over one or more selected paths to the second storage system.

15. A method comprising:
  controlling delivery of input-output operations from a host device to at least first and second storage systems over selected ones of a plurality of paths through a network, the first and second storage systems being arranged in an active-active configuration relative to one another;
  identifying one or more logical storage devices that are each accessible via at least first and second different ones of the paths to respective ones of the first and second storage systems; and
  modifying path selection for input-output operations directed to the one or more identified logical storage devices relative to path selection for input-output operations directed to one or more other logical storage devices;
  wherein a given one of the identified logical storage devices is stored in the first storage system as a first instance of the given identified logical storage device and is also stored in the second storage system as a second instance of the given identified logical storage device, so as to be fully accessible in each of the first and second storage systems;
  wherein input-output operations targeting logical addresses in a first range of logical addresses of the given identified logical storage device are directed to the first instance of the given logical storage device in the first storage system, and input-output operations targeting logical addresses in a second range of logical addresses of the given identified logical storage device, different than the first range of logical addresses of the given identified logical storage device, are directed to the second instance of the given logical storage device in the second storage system, in accordance with the modified path selection for the input-output operations directed to the given identified logical storage device; and wherein the method is performed by at least one processing device comprising a processor coupled to a memory.

16. The method of claim 15 wherein identifying one or more logical storage devices that are each accessible via at least first and second different ones of the paths to respective ones of the first and second storage systems comprises:

sending commands on respective ones of the paths over which a given logical storage device is accessible to the host device;

obtaining from at least one of the first and second storage systems information regarding the given logical storage device responsive to the commands; and determining whether or not the given logical storage device is accessible via at least first and second different ones of the paths to respective ones of the first and second storage systems based at least in part on the obtained information.

17. The method of claim 15 wherein modifying path selection for input-output operations directed to the one or more identified logical storage devices relative to path selection for input-output operations directed to one or more other logical storage devices comprises:

separating the given identified logical storage device into at least first and second portions;

sending input-output operations directed to the first portion over one or more selected paths to the first storage system; and sending input-output operations directed to the second portion over one or more selected paths to the second storage system.

18. A computer program product comprising a non-transitory processor-readable storage medium having stored therein program code of one or more software programs, wherein the program code, when executed by at least one processing device comprising a processor coupled to a memory, causes said at least one processing device:

to control delivery of input-output operations from a host device to at least first and second storage systems over selected ones of a plurality of paths through a network, the first and second storage systems being arranged in an active-active configuration relative to one another;

to identify one or more logical storage devices that are each accessible via at least first and second different ones of the paths to respective ones of the first and second storage systems; and to modify path selection for input-output operations directed to the one or more identified logical storage devices relative to path selection for input-output operations directed to one or more other logical storage devices;

wherein a given one of the identified logical storage devices is stored in the first storage system as a first instance of the given identified logical storage device and is also stored in the second storage system as a second instance of the given identified logical storage device, so as to be fully accessible in each of the first and second storage systems; and wherein input-output operations targeting logical addresses in a first range of logical addresses of the given identified logical storage device are directed to the first instance of the given logical storage device in the first storage system, and input-output operations targeting logical addresses in a second range of logical addresses of the given identified logical storage device, different than the first range of logical addresses of the given identified logical storage device, are directed to the second instance of the given logical storage device in the second storage system, in accordance with the modified path selection for the input-output operations directed to the given identified logical storage device.

19. The computer program product of claim 18 wherein identifying one or more logical storage devices that are each accessible via at least first and second different ones of the paths to respective ones of the first and second storage systems comprises:

sending commands on respective ones of the paths over which a given logical storage device is accessible to the host device;

obtaining from at least one of the first and second storage systems information regarding the given logical storage device responsive to the commands; and determining whether or not the given logical storage device is accessible via at least first and second different ones of the paths to respective ones of the first and second storage systems based at least in part on the obtained information.

20. The computer program product of claim 18 wherein modifying path selection for input-output operations directed to the one or more identified logical storage devices relative to path selection for input-output operations directed to one or more other logical storage devices comprises:

separating the given identified logical storage device into at least first and second portions;

sending input-output operations directed to the first portion over one or more selected paths to the first storage system; and sending input-output operations directed to the second portion over one or more selected paths to the second storage system.

* * * * *